United States Patent [19]
Takada

[11] Patent Number: 4,784,478
[45] Date of Patent: Nov. 15, 1988

[54] MICROSCOPE OBJECTIVE

[75] Inventor: Katsuhiro Takada, Tokyo, Japan

[73] Assignee: Olympus Optical Co., Ltd., Tokyo, Japan

[21] Appl. No.: 890,738

[22] Filed: Jul. 30, 1986

[30] Foreign Application Priority Data

Aug. 2, 1985 [JP] Japan .................. 60-169726
Aug. 2, 1985 [JP] Japan .................. 60-169727

[51] Int. Cl.$^4$ .................. G02B 21/02; G02B 9/12
[52] U.S. Cl. .................. 350/413; 350/414; 350/474; 350/477
[58] Field of Search .................. 350/413, 414, 474, 477

[56] References Cited

U.S. PATENT DOCUMENTS

| | | | |
|---|---|---|---|
| 3,756,698 | 9/1973 | Nakagawa | 350/414 |
| 4,215,914 | 8/1980 | Muchel et al. | 350/413 |
| 4,610,515 | 9/1986 | Tanaka | 350/414 X |

FOREIGN PATENT DOCUMENTS

| | | | |
|---|---|---|---|
| 2756989 | 6/1979 | Fed. Rep. of Germany | 350/414 |
| 47-28057 | 7/1972 | Japan . | |
| 57-39405 | 8/1982 | Japan . | |

OTHER PUBLICATIONS

Design of a Gradient-Index Photographic Objective; L. G. Atkinson, S. N. HoudeWalter, D. T. Moore, D. P. Ryan and J. M. Stagaman; pp. 993–998.

Primary Examiner—John K. Corbin
Assistant Examiner—Scott J. Sugarman
Attorney, Agent, or Firm—Cushman, Darby & Cushman

[57] ABSTRACT

A microscope objective comprising a first lens component, a second lens component located in a range wherein the height of paraxial marginal ray becomes at least a half of the maximum height of paraxial marginal ray to be reached in the microscope objective, and a third lens component, the second lens component being arranged as a graded refractive index (GRIN) lens formed that the refractive index thereof is graded according to the radial distance from the optical axis and, moreover, the dispersion in the marginal portion thereof is different from the dispersion in the central portion thereof, the microscope objective being arranged that chromatic aberration as well as aberrations for the basic wavelength are corrected satisfactorily favorably.

9 Claims, 2 Drawing Sheets

MICROSCOPE OBJECTIVE

BACKGROUND OF THE INVENTION (a) Field of the invention

The present invention relates to a microscope objective and, more particularly, to a microscope objective wherein at least one element constituting the lens system is arranged as a graded refractive index lens (hereinafter referred to as a GRIN lens) formed that the refractive index thereof varies according to the radial distance from the optical axis.

(b) Description of the Prior Art

For microscope objectives, it is required to arranged that aberrations are corrected favourably and, at the same time, to make the numerical aperture (NA) large so as to obtain high resolving power. Besides, it is preferable to make the working distance (WD) long for the purpose of preventing the lens system from colliding against a specimen and for other purposes.

Moreover, as it is necessary to use various microscope objectives by exchanging them, microscope objectives are subject to restrictions, for example, the overall length of the lens system should e within a certain limit, the distance from the object to the image should be maintained as a constant value, and so forth. Furthermore, in ordinary microscope optical systems, blurring of colours is caused and the image becomes indistinct unless chromatic aberration is corrected satisfactorily favourably.

It is very difficult to concurrently satisfy all of the above-mentioned requirements also due to the fact that microscope objectives are enlarging lens systems.

To obtain a microscope objective which satisfies the above-mentioned requirements by overcoming the above-mentioned difficulties, it has been unavoidable to make the number o lenses constituting the lens system very large and, moreover, it has been necessary to use optical materials with anomalous dispersion such as fluorite etc. and to use many cemented lenses.

Generally, an optical system is constructed by combining a large number of lenses. To increase the aberration correcting capacity, it is known to use an aspherical lens and GRIN lens in addition to spherical lenses. Besides, as for correction of chromatic aberration, it is known to control not only refractive indices in the central portion of a lens in respect to wavelengths, i.e., dispersion, but also to control the distribution of refractive indices for wavelengths so as to thereby correct chromatic aberration.

Microscope optical systems each employing a GRIN lens are disclosed in Japanese published examined patent applications Nos. 28057/72 and 39405/82.

Out of said Japanese published examined patent applications, the former does not disclose any description related to correction of aberrations. The latter shows description about correction of offaxial aberrations by using a GRIN lens. However, it does not disclose any description about correction of chromatic aberration.

SUMMARY OF THE INVENTION

It is, therefore, a primary object of the present invention to provide a microscope objective comprising a GRIN (graded refractive index) lens, which is formed that the refractive index thereof varies according to the radial distance from the optical axis, and arranged that chromatic aberration as well as aberrations for the basic wavelength are corrected by using said GRIN lens.

To attanin the above-mentioned object, the microscope objective according to the present invention is arranged that at least one GRIN lens formed as above is arranged in the lens system and said GRIN lens is formed that the dispersion in the marginal portion thereof is different from the dispersion in the central portion thereof.

The microscope objective according to the present invention comprises, in the order from the object side, a first lens component having negative refractive power, a second lens component located in a range wherein the height of paraxial marginal ray becomes at least a half of the maximum height of paraxial marginal ray to be reached in said microscope objective, and a third lens component, at least said second lens component out of said lens components being arranged as a GRIN lens which is formed that the refractive index thereof is graded according to the radial distance from the optical axis as mentioned in the above and, moreover, the dispersion in the marginal portion thereof is smaller than the dispersion in the central portion thereof.

The microscope objective according to the present invention comprises, in the order from the object side, a first lens component having positive refractive power, a second lens component located in a range wherein the height of paraxial marginal ray becomes at least a half of the meximum height of paraxial marginal ray to be reached in said microscope objective, and a third lens component, at least said second lens component out of said lens components being arranged as a GRIN lens which is formed that the rafractive index thereof is graded according to the radial distance from the optical axis and, moreover, the dispersion in the marginal portion thereof is larger than the dispersion in the central portion thereof.

Generally, microscope objectives should be arranged that spherical aberration, coma, curvature of field, astigmatism, etc. are corrected satisfactorily favourably. When it is attempted to especially correct curvature of field and astigmatism out of said aberrations, the limitation in the correction of the other aberrations becomes strict, and it is difficult to correct all of said aberrations favourably.

When it is further attempted to correct chromatic aberration too, it is necessary to proceed with the design of the lens system in the state that the refractive indices, dispersion, etc. of the glass materials to be used are taken into consideration to some extent from the beginning, and this becomes a considerable limitation in the correction of aberrations.

Generally, chromatic aberration is corrected by controlling radii of curvature of refractive surfaces, distances between surfaces, refractive indices, dispersion, etc. However, when a GRIN lens is used, it is also possible to correct chromatic aberration by further controlling the distribution of dispersion, i.e., distribution of refractive indices in respect to respective wavelengths. For example, it is derived from the aberration theory that longitudinal chromatic aberration which becomes the basis in the correction of chromatic aberration can be corrected perfectly, when a GRIN lens is used, by controlling radii of curvature of its refractive surfaces and distribution of refractive indices in respect to respective wavelengths though the GRIN lens is a single lens. The above-mentioned effect cannot be expected of lens systems comprising homogeneous lenses only, and this shows that the chromatic aberration correcting capacity to be obtained by the use of GRIN lens is large.

To correct chromatic aberration in case of a microscope objective, it is advantageous when a GRIN lens is arranged in a position where the height of paraxial marginal ray becomes the highest.

Generally, when correcting chromatic aberration, it is necessary to correct both of longitudinal chromatic aberration and lateral chromatic aberration. Out of them, lateral chromatic aberration relates to the quality of image to be formed by offaxial rays. In microscope objectives in general, offaxial principal rays are transmitted in the state that they do not go away from the optical axis and, therefore, the correcting effect for lateral chromatic aberration to be obtained by the use of GRIN lens is somewhat smaller compared with the correcting effect for longitudinal chromatic aberration. Therefore, it is effective when it is arranged to correct lateral chromatic aberration by means of other parameters and to chiefly correct longitudinal chromatic aberration by means of the GRIN lens by controlling the distribution of refractive indices thereof in respect to respective wavelengths. Hence, it is preferable to arrange the GRIN lens in the afore-mentioned position where the state of rays can be controlled effectively.

Due to the above-mentioned reason, the microscope objective according to the present invention is arranged to comprise three lens components, i.e., a first lens component, a second lens component formed as a GRIN lens, and a third lens component.

The first lens component should have strong refractive power in order to ensure a desired magnification and, usually, it is formed as a lens component having strong curvature in order to correct curvature of field favourably. When the first lens component is arranged as mentioned in the above and arranged to have negative refractive power, large positive longitudinal chromatic aberration is caused by said first lens component.

To correct said positive longitudinal chromatic aberration, the GRIN lens constituting the second lens component may be formed that the dispersion in the marginal portion thereof is smaller than the dispersion in the central portion thereof and the refractive index thereof is varied according to the radial distance from the optical axis so that said GRIN lens causes negative longitudinal chromatic aberration so as to thereby correct said positive longitudinal chromatic aberration.

If the GRIN lens is formed that the dispersion in the marginal portion thereof is larger than the dispersion in the central portion thereof, it causes positive longitudinal chromatic aberration. To correct said positive longitudinal chromatic aberration, complicated lens components should be arranged on the image side of second lens component, and it is very disadvantageous.

When the lens system is arranged that the first lens component has positive refractive power, large negative longitudinal chromatic aberration is caused by said first lens component. Therefore, in that case, it is possible to correct chromatic aberration of the lens system by forming the GRIN lens constituting the second lens component that the dispersion in the marginal portion thereof is larger than the dispersion in the central portion thereof and the refractive index thereof is varied according to the radial distance from the optical axis so that said GRIN lens causes positive longitudinal chromatic aberration.

The above-mentioned GRIN lens makes it possible to obtain a chromatic aberration correcting effect which is equivalent to the afore-mentioned correcting effect also when said GRIN lens is located in a range wherein the height of paraxial marginal ray becomes a half of the maximum height of paraxial marginal ray to be reached in the lens system.

Besides, when the GRIN lens is arranged in a position on the image side of the position where offaxial ray intersects with the optical axis, it is possible to easily correct lateral chromatic aberration which has been corrected by means of parameters other than the distribution of refractive indices.

DETAILED DESCRIPTION OF THE PREFERRED EMBODIMENTS

Figure 1:
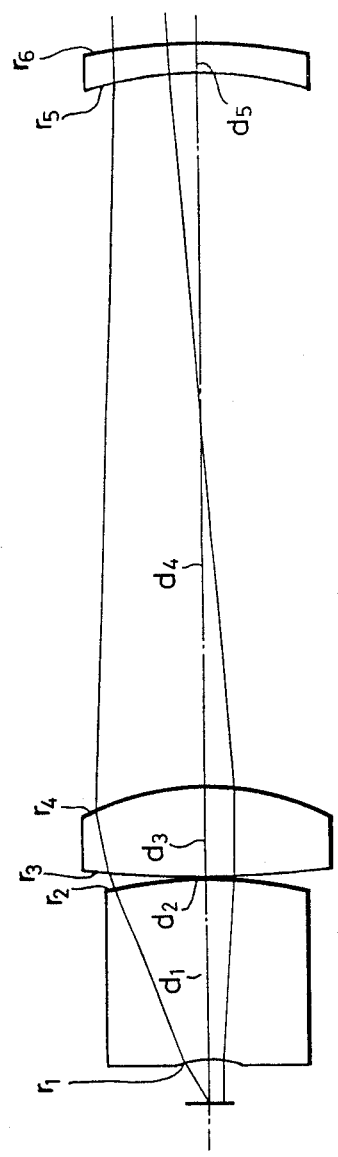
FIG. 1 shows a sectional view of Embodiment 1 of the microscope objective according to the present invention.
Figure 2:
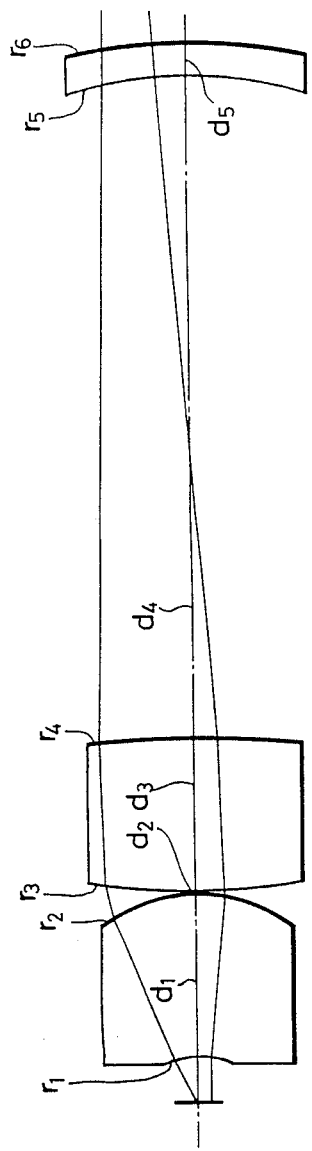
FIG. 2 shows a sectional view of Embodiment 2 of the microscope objective according to the present invention.
Figure 3:
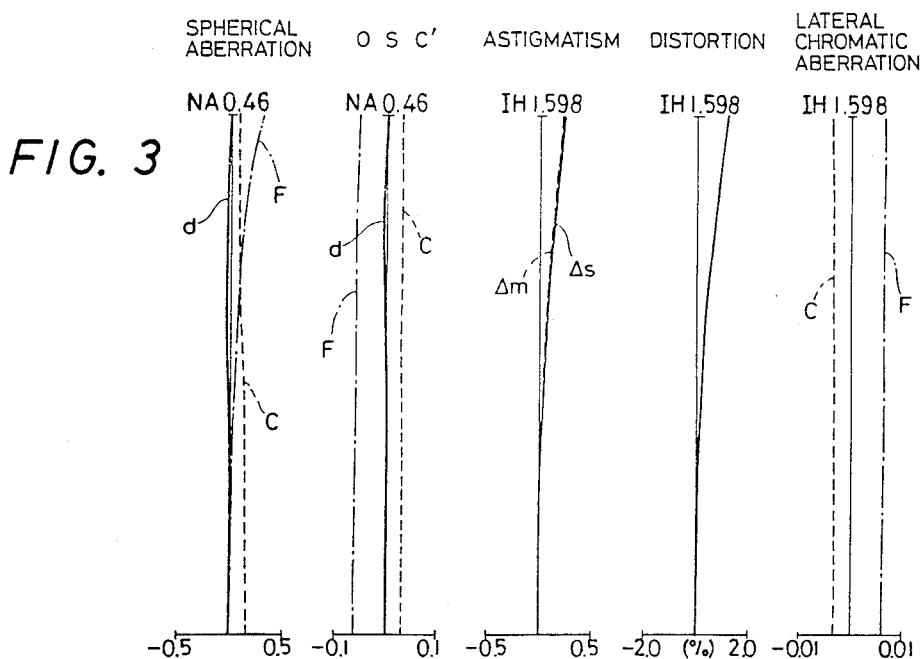
FIG. 3 shows graphs illustrating aberration curves of Embodiment 1 of the present invention.
Figure 4:
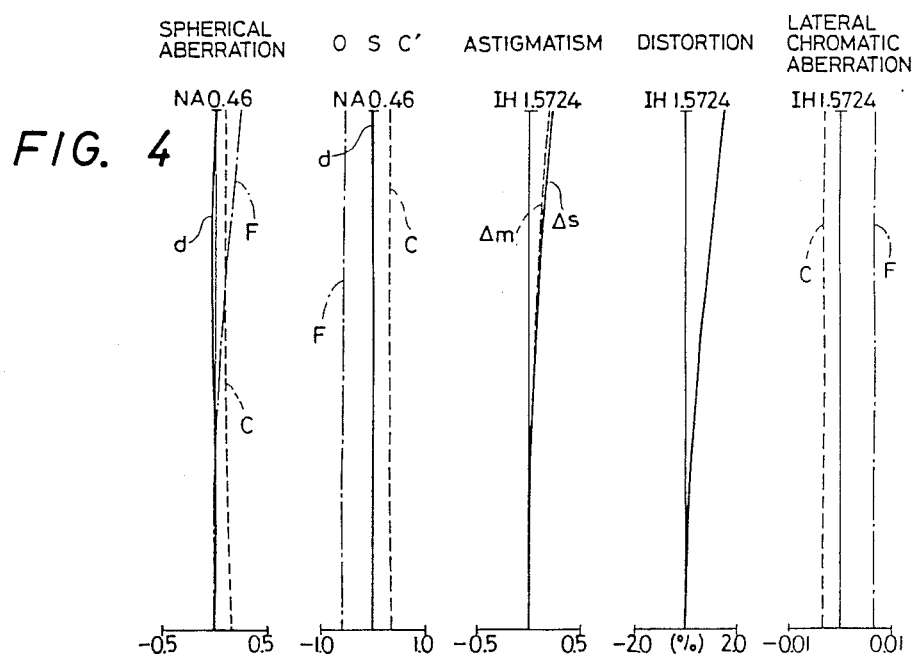
FIG. 4 shows graphs illustrating aberration curves of Embodiment 2 of the present invention.

Now, preferred embodiments of the microscope objective according to the present invention described so far are shown below.

| Embodiment 1 | | | |
|---|---|---|---|
| $f = 1$, | $NA = 0.46$, | $\beta = 20x$, | |
| $WD = 0.2301$, | $f_1 = -1.509$, | $\Delta = -15.38$ | |
| $r_1 = -0.4685$ | | | |
| | $d_1 = 0.9099$ | $n_{01} = 1.77250$ | $\nu_{01} = 49.65(*)$ |
| $r_2 = -2.1145$ | | | |
| | $d_2 = 0.0121$ | | |
| $r_3 = 5.2375$ | | | |
| | $d_3 = 0.4569$ | $n_{02} = 1.72600$ | $\nu_{02} = 53.54(*)$ |
| $r_4 = -1.2102$ | | | |
| | $d_4 = 3.5238$ | | |
| $r_5 = -2.3157$ | | | |
| | $d_5 = 0.1297$ | $n_{03} = 1.51633$ | $\nu_{03} = 64.14(*)$ |
| $r_6 = -3.1352$ | | | |

| $\lambda(nm)$ | $n_1$ | $n_2$ |
|---|---|---|
| First lens group | | |
| 587.56 | −0.13392 | $-0.52500 \times 10^{-1}$ |
| 656.28 | −0.14597 | $-0.30333 \times 10^{-1}$ |
| 486.13 | −0.11449 | $-0.72316 \times 10^{-1}$ |
| Second lens group | | |
| 587.56 | −0.18064 | $0.15328 \times 10^{-1}$ |
| 656.28 | −0.17344 | $0.12091 \times 10^{-1}$ |
| 486.13 | −0.18962 | $0.18125 \times 10^{-1}$ |
| Third lens group | | |
| 587.56 | −0.15382 | 0.20112 |
| 656.28 | −0.16070 | 0.20488 |
| 486.13 | −0.14070 | 0.19878 |

| Embodiment 2 | | | |
|---|---|---|---|
| $f = 1$, | $NA = 0.46$, | $\beta = 20x$, | |
| $WD = 0.2265$, | $f_1 = 4.895$ | $\Delta = 11.32$ | |
| $r_1 = -0.4325$ | | | |
| | $d_1 = 0.8270$ | $n_{01} = 1.83400$ | $\nu_{01} = 37.16$ |
| $r_2 = -0.7311$ | | | |
| | $d_2 = 0.0119$ | | |
| $r_3 = 2.8175$ | | | |
| | $d_3 = 0.7471$ | $n_{02} = 1.72600$ | $\nu_{02} = 53.54(*)$ |
| $r_4 = -5.0371$ | | | |
| | $d_4 = 3.2187$ | | |
| $r_5 = -2.3789$ | | | |
| | $d_5 = 0.1472$ | $n_{03} = 1.51633$ | $\nu_{03} = 64.14(*)$ |

-continued $r_6 = -3.2099$

| $\lambda$(nm) | $n_1$ | $n_2$ |
|---|---|---|
| | Second lens group | |
| 587.56 | $-0.64491 \times 10^{-1}$ | $0.15529 \times 10^{-2}$ |
| 656.28 | $-0.67774 \times 10^{-1}$ | $0.26729 \times 10^{-4}$ |
| 486.13 | $-0.56174 \times 10^{-1}$ | $0.57479 \times 10^{-2}$ |
| | Third lens group | |
| 587.56 | $-0.26784$ | $0.20944$ |
| 656.28 | $-0.26756$ | $0.20946$ |
| 486.13 | $-0.26793$ | $0.20855$ |

(mark * represents coeffcients of GLIN lens)

In respective embodiments shown in the above, reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_{01}$, $n_{02}$ and $n_{03}$ respectively represent refractive indices of respective lenses (refractive index on the optical axis in case of a GRIN lens marked with "*"), reference symbols $\nu_{01}$, $\nu_{02}$ and $\nu_{03}$ respectively represent Abbe's numbers of respective lenses (Abbe's number on the optical axis in case of a GRIN lens), reference symbol f represents the focal length of the lens system as a whole, reference symbol $f_1$ represents the focal length of the first lens component, reference symbol NA represents the numerical aperture, reference symbol $\beta$ represents the magnification, reference symbol WD represents the working distance, reference symbol $\Delta$ represents the difference between Abbe's number on the optical axis of the GRIN lens used as the second lens component and Abbe's number of said GRIN lens at a position at the distance of 0.5 from the optical axis, and the dispersion in the marginal portion is smaller than the dispersion in the central portion when $\Delta$ is negative while the dispersion in the marginal portion is larger than the dispersion in the central portion when $\Delta$ is positive.

In the GRIN lens, refractive indices for respective wavelengths are distribured as expressed by the following formula, where reference symbol $\rho$ represents the radial distance from the optical axis and reference symbol $\lambda$ represents the wavelength.

$$n(\lambda) = n_o + n_1(\lambda)\rho^2 + n_2(\lambda)\rho^4 + \ldots$$

In the formula shown in the above, reference symbol $n_0(\lambda)$ represents the refractive index for the wavelength $\lambda$ on the optical axis of the GRIN lens, reference symbols $n_1(\lambda)$, $n_2(\lambda)$, ... respectively represent coefficients of the second order, fourth order, etc, for the wavelength $\lambda$ at the distance $\rho$. Distribution coefficients shown in the numerical data of respective embodiments shown in the above are those for d-line, c-line and F-line.

In Embodiment 1, the first lens component has negative refractive power and the value of $\Delta$ is negative. Besides, the first and third lens components are also arranged as GRIN lenses.

In Embodiment 2, the first lens component has positive refractive power and the value of $\Delta$ is positive. Besides, the third lens component is also arranged as a GRIN lens.

As described in detail so far and as it is evident from respective embodiments, the present invention provides a microscope objective which is arranged to have an extremely simple lens composition and, at the same time arranged to have very high performance by correcting not only aberrations for the basic wavelength but also chromatic aberration.

I claim:

1. A microscope objective comprising a first lens component, a second lens component located in a range wherein the height of paraxial marginal ray becomes at least a half of the maximum height of paraxial marginal ray to be reached in said microscope objective, and a third lens component in the order from the object side, and said second lens component being arranged as a graded refractive index lens formed that the refractive index thereof is graded according to the radial distance from the optical axis and, moreover, the dispersion in the marginal portion thereof is different from the dispersion in the central portion thereof.

2. A microscope objective according to claim 1, wherein said first lens component has negative refractive power and said second lens component is arranged as a graded refractive index lens formed that the dispersion in the marginal portion thereof is smaller than the dispersion in the central portion thereof.

3. A microscope objective according to claim 2, wherein said second lens component is located in a position where the height of paraxial marginal ray becomes the highest.

4. A microscope objective according to claim 1, wherein said first lens component has positive refractive power and said second lens component is arranged as a graded refractive index lens formed that the dispersion in the marginal portion thereof is larger than the dispersion in the central portion thereof.

5. A microscope objective according to claim 4, wherein said second lens component is located in a position where the height of paraxial marginal ray becomes the highest.

6. A microscope objective according to claim 3, wherein each of said first lens component and third lens component is arranged as a graded refractive index lens formed that the refractive index thereof is graded according to the radial distance from the optical axis.

7. A microscope objective according to claim 5, wherein said third lens component is arranged as a graded refractive index lens formed that the refractive index thereof is graded according to the radial distance from the optical axis.

8. A microscope objective according to claim 6, having the following numerical data:

| f = 1 | NA = 0.46, | $\beta$ = 20x, |
|---|---|---|
| WD = 0.2301 | $f_1 = -1.509$ | $\Delta = -15.38$ |
| $r_1 = -0.4685$ | | |
| $d_1 = 0.9099$ | $n_{01} = 1.77250$ | $\nu_{01} = 49.65(*)$ |
| $r_2 = -2.1145$ | | |
| $d_2 = 0.0121$ | | |
| $r_3 = 5.2375$ | | |
| $d_3 = 0.4569$ | $n_{02} = 1.72600$ | $\nu_{02} = 53.54(*)$ |
| $r_4 = -1.2102$ | | |
| $d_4 = 3.5238$ | | |
| $r_5 = -2.3157$ | | |
| $d_5 = 0.1297$ | $n_{03} = 1.51633$ | $\nu_{03} = 64.14(*)$ |
| $r_6 = -3.1352$ | | |

| $\lambda$(nm) | $n_1$ | $n_2$ |
|---|---|---|
| | First lens group | |
| 587.56 | $-0.13392$ | $-0.52500 \times 10^{-1}$ |
| 656.28 | $-0.14597$ | $-0.30333 \times 10^{-1}$ |
| 486.13 | $-0.11449$ | $-0.72316 \times 10^{-1}$ |
| | Second lens group | |
| 587.56 | $-0.18064$ | $0.15328 \times 10^{-1}$ |

-continued

| | | |
|---|---|---|
| 656.28 | −0.17344 | $0.12091 \times 10^{-1}$ |
| 486.13 | −0.18962 | $0.18125 \times 10^{-1}$ |
| Third lens group | | |
| 587.56 | −0.15382 | 0.20112 |
| 656.28 | −0.16070 | 0.20488 |
| 486.13 | −0.14070 | 0.19878 |

(mark * represents coefficients of GLIN lens)

where, reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_{01}$, $n_{02}$ and $n_{03}$ respectively represent refractive indices of respective lenses (refractive index on the optical axis in case of a graded refractive index lens), reference symbols $\nu_{01}$, $\nu_{02}$ and $\nu_{03}$ respectively represent Abbe's numbers of respective lenses (Abbe's number on the optical axis in case of a graded refractive index lens), reference symbol f represents the focal length of the lens system as a whole, reference symbol $f_1$ represents the focal length of the first lens component, reference symbol NA represents the numerical aperture, reference symbol $\beta$ represents the magnification, reference symbol WD represents the working distance and reference symbol $\Delta$ represents the difference between Abbe's number on the optical axis of the graded refractive index lens used as the second lens component and Abbe's number of said graded refractive index lens at a position at the distance of 0.5 from the optical axis.

9. A microscope objective according to claim 7, having the following numerical data:

| f = 1, | NA = 0.46 | $\beta$ = 20x, |
|---|---|---|
| WD = 0.2265 | $f_1$ = 4.895 | $\Delta$ = 11.32 |
| $r_1$ = −0.4325 | | |
| $d_1$ = 0.8270 | $n_{01}$ = 1.83400 | $\nu_{01}$ = 37.16 |
| $r_2$ = −0.7311 | | |
| $d_2$ = 0.0119 | | |
| $r_3$ = 2.8175 | | |
| $d_3$ = 0.7471 | $n_{02}$ = 1.72600 | $\nu_{02}$ = 53.54(*) |
| $r_4$ = −5.0371 | | |
| $d_4$ = 3.2187 | | |
| $r_5$ = −2.3789 | | |
| $d_5$ = 0.1472 | $n_{03}$ = 1.51633 | $\nu_{03}$ = 64.14(*) |
| $r_6$ = −3.2099 | | |

| $\lambda$(nm) | $n_1$ | $n_2$ |
|---|---|---|
| Second lens group | | |
| 587.56 | $-0.64491 \times 10^{-1}$ | $0.15529 \times 10^{-2}$ |
| 656.28 | $-0.67774 \times 10^{-1}$ | $0.26729 \times 10^{-4}$ |
| 486.13 | $-0.56174 \times 10^{-1}$ | $0.57479 \times 10^{-2}$ |
| Third lens group | | |
| 587.56 | −0.26784 | 0.20944 |
| 656.28 | −0.26756 | 0.20946 |
| 486.13 | −0.26793 | 0.20855 |

(mark * represents coefficients of GRIN lens)

where, reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_{01}$, $n_{02}$ and $n_{03}$ respectively represent refractive indices of respective lenses (refractive index on the optical axis in case of a graded refractive index lens), reference symbols $\nu_{01}$, $\nu_{02}$ and $\nu_{03}$, respectively represent Abbe's numbers of respective lenses (Abbe's number on the optical axis in case of a graded refractive index lens), reference symbol f represents the focal length of the lens system as a whole, reference symbol $f_1$ represents the focal length of the first lens component, reference symbol NA represents the numerical aperture, reference symbol $\beta$ represents the magnification, reference symbol WD represents the working distance, and reference symbol $\Delta$ represents the difference between Abbe's number on the optical axis of the graded refractive index lens used as the second lens component and Abbe's number of said graded refractive index lens at a position at the distance of 0.5 from the optical axis.

* * * * *